US012026258B2

(12) United States Patent
Nagayoshi et al.

(10) Patent No.: US 12,026,258 B2
(45) Date of Patent: Jul. 2, 2024

(54) INFORMATION PROCESSING DEVICE, VERIFICATION METHOD AND VERIFICATION PROGRAM

(71) Applicant: NIPPON TELEGRAPH AND TELEPHONE CORPORATION, Tokyo (JP)

(72) Inventors: Takeshi Nagayoshi, Tokyo (JP); Yuichi Komatsu, Tokyo (JP); Ryota Sato, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 551 days.

(21) Appl. No.: 17/263,517

(22) PCT Filed: Jul. 30, 2019

(86) PCT No.: PCT/JP2019/029907
§ 371 (c)(1),
(2) Date: Jan. 26, 2021

(87) PCT Pub. No.: WO2020/027159
PCT Pub. Date: Feb. 6, 2020

(65) Prior Publication Data
US 2021/0232689 A1 Jul. 29, 2021

(30) Foreign Application Priority Data
Jul. 31, 2018 (JP) .................................. 2018-144329

(51) Int. Cl.
*G06F 21/57* (2013.01)
*G06F 21/31* (2013.01)
(Continued)

(52) U.S. Cl.
CPC .............. *G06F 21/57* (2013.01); *G06F 21/31* (2013.01); *G06F 21/62* (2013.01); *G06F 21/64* (2013.01);
(Continued)

(58) Field of Classification Search
CPC .......... G06F 21/57; G06F 21/31; G06F 21/62; G06F 21/64; G06F 2221/034; G06F 21/51; H04L 9/3247
See application file for complete search history.

(56) References Cited

U.S. PATENT DOCUMENTS 8,214,654 B1 * 7/2012 Wyatt ................. H04L 63/0478
713/191
10,320,556 B2 * 6/2019 Chen .................... H04W 12/106
(Continued)

FOREIGN PATENT DOCUMENTS

CN 107797827 A 3/2018
EP 1659810 A1 * 5/2006 ......... H04L 63/0442
(Continued)

OTHER PUBLICATIONS

William R. Stanek (2009) "File and Folder Permissions," from Chapter 13, Microsoft Windows 2000 Administrator's Pocket Consultant [online] <https://docs.microsoft.com/en-us/previous-versions/windows/it-pro/windows-erver-2000/bb727008(v=technet. 10)> [retrieved on Jul. 18, 2018].
(Continued)

*Primary Examiner* — Christopher A Revak

(57) ABSTRACT

An information processing device includes a memory, and processing circuitry coupled to the memory and configured to acquire, from a storage of a security module with tamper resistance, information related to a verification key and ID information of the configuration file for verifying a digital signature for a configuration file, and use the acquired
(Continued)

information related to the verification key and ID information to cause an application program to execute processing of verifying integrity of configuration data of the configuration file, acquire registration version information from the storage of the security module, and use the acquired registration version information to cause the application program to execute processing of verifying a configuration version of the configuration file, and update the registration version information to the version of the configuration version when the configuration version of the configuration file and the registration version information satisfy a predetermined condition.

7 Claims, 10 Drawing Sheets

(51) Int. Cl.
    *G06F 21/62*       (2013.01)
    *G06F 21/64*       (2013.01)
    *H04L 9/32*        (2006.01)
(52) U.S. Cl.
    CPC ...... *H04L 9/3247* (2013.01); *G06F 2221/034* (2013.01)

(56) References Cited

U.S. PATENT DOCUMENTS

| | | | |
|---|---|---|---|
| 10,754,988 B2* | 8/2020 | Tasher | G06F 21/602 |
| 11,552,938 B2* | 1/2023 | Katayama | H04W 12/04 |
| 2007/0043942 A1 | 2/2007 | Wong | |
| 2011/0078458 A1* | 3/2011 | Furukawa | G06F 21/64 713/189 |
| 2018/0060607 A1 | 3/2018 | Tasher et al. | |
| 2019/0042230 A1* | 2/2019 | Dewan | G06F 21/57 |

FOREIGN PATENT DOCUMENTS

| | | | | |
|---|---|---|---|---|
| EP | 3489853 A | * | 5/2019 | G06F 21/64 |
| EP | 3700243 A1 | * | 2/2020 | H04W 12/00 |
| EP | 4287054 A1 | * | 12/2023 | G06F 21/53 |
| WO | WO-2017008953 A1 | * | 1/2017 | G06F 21/57 |

OTHER PUBLICATIONS

"TPM Usage," The Chromium Projects [online] <https://www.chromium.org/developers/design-documents/tpm-usage> [retrieved on Jul. 18, 2018].

Trusted Computing Group, Inc. (2008) "TCG Mobile Trusted Module Specification" Specific version 1.0, Revision 6, Jun. 26, 2008.

* cited by examiner

INFORMATION PROCESSING DEVICE, VERIFICATION METHOD AND VERIFICATION PROGRAM

CROSS-REFERENCE TO RELATED APPLICATIONS

This application is a U.S. 371 Application of International Patent Application No. PCT/JP2019/029907, filed on 30 Jul. 2019, which application claims priority to and the benefit of JP Application No. 2018-144329, filed on 31 Jul. 2018, the disclosures of which are hereby incorporated herein by reference in their entireties.

TECHNICAL FIELD

The present invention relates to an information processing device, a verification method, and a verification program.

BACKGROUND ART

There is known a conventional technique for checking the integrity of configuration data of a configuration file when an application (AP) program uses the configuration file. Here, the integrity means that the target data has not been tampered with. Further, tampering includes replacement with a different version (rollback attack, etc.).

For example, there is known an access control performed by an operating system (OS) to ensure the integrity of configuration data. The OS provides an access control mechanism for AP programs and files. A function of the OS can set an authority such that the configuration file is updated by only an authorized user or program. In other words, as long as the OS operates properly, an authorized AP program operates properly, and a user properly sets an authority, the integrity of the configuration data is considered protected when the AP program refers to the configuration data.

There is known a technique for checking the integrity of a boot program using a security module such as a TPM (Trusted Platform Module) in an information processing device. This technique can check the integrity of programs such as firmware and kernel to be executed in the process until the OS is started, but it is for such programs to be executed before the OS is started, and is not available for AP programs to be executed after the OS is started. In other words, the security module cannot be used to check the integrity of the configuration file by using only the AP programs to be executed after the OS is started.

For example, the security module has an access control mechanism independent of the OS, and has a function of recording the version numbers of the programs and referring to the version numbers, and a function of increasing (upgrading) the version number under the authority set by the access control mechanism. Further, the security module has tamper resistance, and thus it is physically very difficult to perform operations other than the above described operations on the version number.

For example, it is assumed that firmware in a read-only area (read-only firmware), upgradable firmware (read-write firmware), kernel, and programs and services of which the OS is composed are executed in this order until the OS is started. A previously executed program confirms the version of the next program and the version number recorded in a security chip, and if the version is correct, executes the next program. The access control mechanism of the security module has a mechanism for determining whether a program to be executed before the OS of the information processing device is started (pre-OS environment) has an access authority, so that only the authorized program (firmware before the OS is started) determined to have the access authority can update the version number.

CITATION LIST

Non Patent Literature

[NPL 1] "File and Folder Permissions", [online], [retrieved on 2018-07-18], Internet <https://docs.microsoft.com/en-us/previous-versions/windows/it-pro/windows-server-2000/bb727008 (v=technet. 10)>
[NPL 2] "TPM Usage", [online], [retrieved on 2018-07-18], Internet <https://www.chromium.org/developers/design-documents/tpm-usag e>

SUMMARY OF THE INVENTION

Technical Problem

However, the conventional techniques have a problem that the integrity of configuration data cannot be properly checked by an application program without depending on the OS. For example, in the conventional technique depending on the access control of the OS, authorities are properly set for all the programs and files which operate on the OS, and only if conditions are satisfied in which all privileged programs and files do not perform an unexpected operation due to tampering, and all privileged users who use the information processing device properly manage their passwords and the like for exercising the authority, it is expected that the integrity of the configuration data is protected when the AP program refers to the configuration data.

However, the above conditions may be set for many varieties of management targets (users, files, programs), and maintaining an integral state requires a lot of cost, and it is also difficult to check the state. In other words, in reality, it is often impossible to maintain the integral state. For example, if a malicious operation or an operational failure made by a user causes a route (security hole) that allows malware to intrude with administrator authority in a system and then the malware intrudes into it, the malware will tamper with any configuration file with administrator authority. It is difficult for the AP program depending only on the access control of the OS to detect such tampering of the configuration file.

Further, in the technique for checking the integrity of the boot program using the security module, the right (permission) of access to the security chip when updating the version information and the like in the integrity check in the process prior to start of the OS is granted to programs to be executed before the OS is started, and is not available for a general AP program after the OS is started. In other words, the security chip cannot be used to check the integrity of the configuration file and the like by using only general AP programs to be executed after the OS is started.

Means for Solving the Problem

In order to solve the above-described problems and achieve the object, an information processing device of the present invention includes: a memory; and processing circuitry coupled to the memory and configured to: acquire, from a storage of a security module with tamper resistance, information related to a verification key and ID information of the configuration file for verifying a digital signature for a configuration file, and use the acquired information related to the verification key and ID information to cause an application program to execute processing of verifying integrity of configuration data of the configuration file, acquire registration version information from the storage of the security module, and use the acquired registration version information to cause the application program to execute processing of verifying a configuration version of the configuration file, and update the registration version information to the version of the configuration version when the configuration version of the configuration file and the registration version information satisfy a predetermined condition.

Further, the verification method of the present invention includes acquiring, from a storage of a security module with tamper resistance, information related to a verification key and ID information of the configuration file for verifying a digital signature for a configuration file, and using the acquired information related to the verification key and ID information to cause an application program to execute processing of verifying integrity of configuration data of the configuration file; of acquiring registration version information from the storage of the security module, and using the acquired registration version information to cause the application program to execute processing of verifying a configuration version of the configuration file; updating the registration version information to the version of the configuration version when the configuration version of the configuration file and the registration version information satisfy a predetermined condition, by processing circuitry.

Further, a non-transitory computer-readable recording medium storing therein a verification program of the present invention causes a computer to execute a process including: acquiring, from a storage of a security module with tamper resistance, information related to a verification key and ID information of the configuration file for verifying a digital signature for a configuration file, and using the acquired information related to the verification key and ID information to cause an application program to execute processing of verifying integrity of configuration data of the configuration file; acquiring registration version information from the storage of the security module, and using the acquired registration version information to cause the application program to execute processing of verifying a configuration version of the configuration file; and updating the registration version information to the version of the configuration version when the configuration version of the configuration file and the registration version information satisfy a predetermined condition.

Effects of the Invention

The present invention has an effect that an application program can properly check the integrity of configuration data without depending on the OS.

DESCRIPTION OF EMBODIMENTS

Embodiments of an information processing device, a verification method, and a verification program according to the present application will be described below in detail with reference to the drawings. Note that the information processing device, the verification method, and the verification program according to the present application are not limited by the embodiments.

First Embodiment

In the following embodiment, a configuration of a system according to a first embodiment and a flow of processing in an information processing device will be described in this order, and finally, advantageous effects of the first embodiment will be described.

Configuration of System

Figure 1:
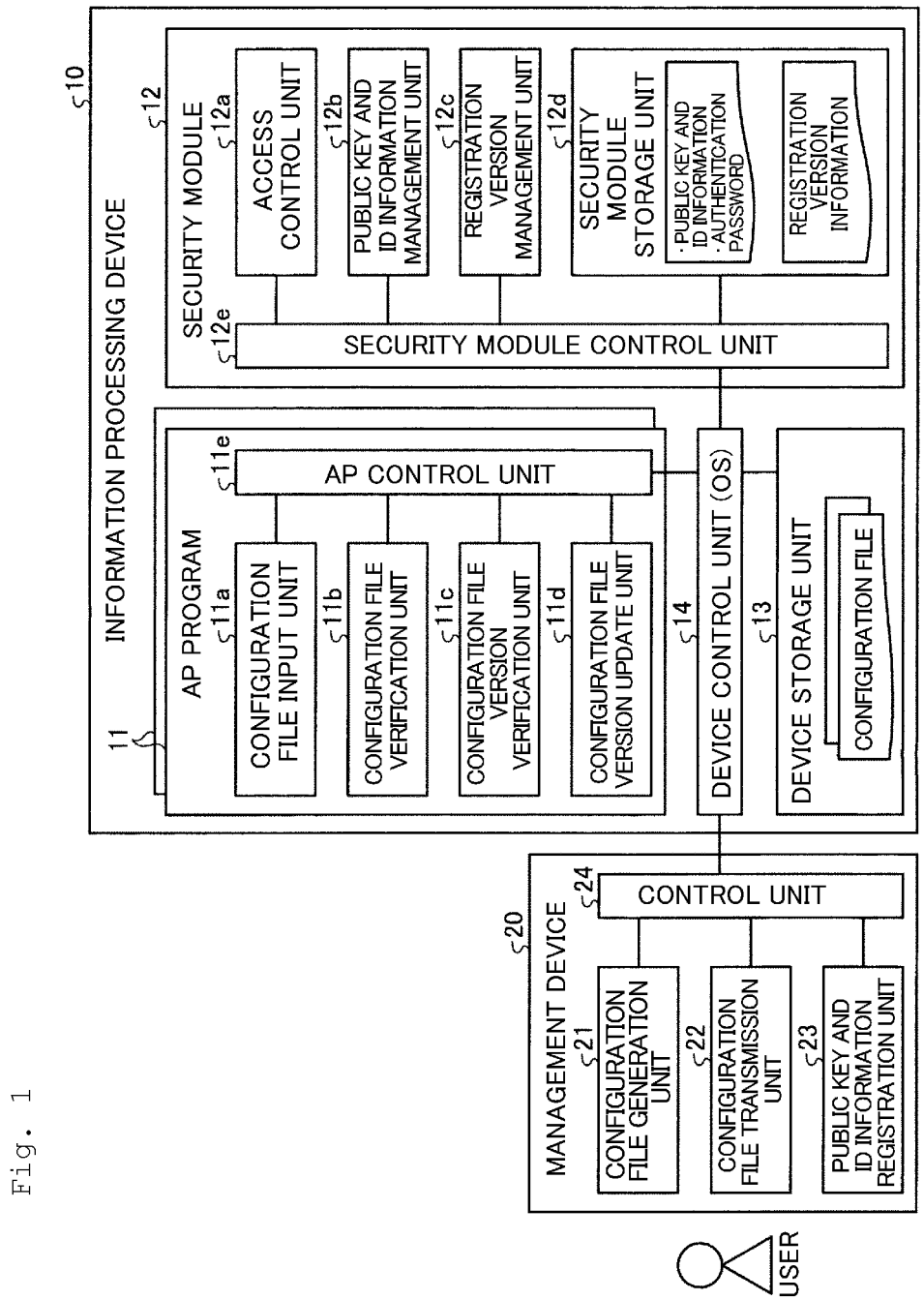
FIG. 1 is a diagram illustrating an example of a configuration of a system according to a first embodiment.

First, the configuration of the system according to the first embodiment will be described with reference to FIG. 1. FIG. 1 is a diagram illustrating an example of the configuration of the system according to the first embodiment. The system according to the first embodiment includes an information processing device 10 and a management device 20. Note that the numbers of devices illustrated in FIG. 1 are merely an example, and are not limited thereto. For example, the information processing device 10 and the management device 20 may be configured as one device.

On the information processing device 10, one or more AP programs 11 are installed. On the information processing device 10, a security module 12 with tamper resistance (e.g., TPM) is installed. The information processing device 10 also includes a device storage unit 13 such as a hard disk and a device control unit 14 such as an operating system.

The management device 20 remotely generates a configuration file to be input to the AP program. 11 by a user who has the authority of digital signature, and transmits the configuration file to the information processing device 10. Further, using the management device 20, a user who has the right of access to public key information remotely updates the public key information of the security module. Note that its device configuration may be the same as that of the information processing device 10.

First, each functional unit of the information processing device 10 will be described. The application program 11 of the information processing device 10 includes a configuration file input unit 11a, a configuration file verification unit 11b, a configuration file version verification unit 11c, a configuration file version update unit 11d, and an AP control unit 11e.

The configuration file input unit 11a reads a configuration file recorded in the device storage unit 13. Note that, in the present embodiment, a case of reading it from the storage unit of the same device is described, but it may be acquired via an NW.

The configuration file verification unit 11b acquires, from a security module storage unit 12d, a public key for verifying the digital signature for the configuration file and ID information of the configuration file, and uses the acquired public key and ID information to execute processing of verifying the integrity of configuration data of the configuration file.

The configuration file version verification unit 11c acquires registration version information from the security module storage unit 12d, and uses the acquired registration version information to execute processing of verifying the configuration version of the configuration file.

The configuration file version update unit 11d executes processing of updating the registration version information to the version of the configuration version when the configuration version of the configuration file and the registration version information satisfy a predetermined condition. For example, a case will be described below where the predetermined condition is set that, for the configuration version of the configuration file being one new version next to the registration version information, the registration version is to be updated (incremented) to the new version. Note that the predetermined condition can be set for each information processing device 10 or each AP program 11. In this way, it is possible to specify an allowable result of updater for each information processing device 10 or each AP program 11. As a result, an operator can create version information and a configuration file for each information processing device 10 or each AP program 11 to carry out a unique update. Further, the predetermined condition is changeable information. For example, the predetermined condition may be changed and set that, for the configuration version of the configuration file being two versions newer than the registration version information, it is accepted as a result of an appropriate update, and the registration version is to be updated to the version of the configuration version.

The AP control unit 11e controls each of the above units of the AP program 11. The AP control unit 11e permits the use of the configuration file only when the integrity of the configuration data is OK and the configuration version is equal to the registration version. Further, the AP control unit 11e accesses the security module 12 via the device control unit 14.

The security module 12 includes an access control unit 12a, a public key and ID information management unit 12b, a registration version management unit 12c, the security module storage unit 12d, and a security module control unit 12e.

The access control unit 12a controls access to data in the security module storage unit 12d. Specifically, the access control unit 12a receives an update request for a public key and ID information stored in the security module storage unit 12d, verifies an authentication password input by the user, and determines whether to permit the update of the public key and the ID information according to the result of verification.

For example, the access control unit 12a performs access restriction to update operation for the public key and the ID information by authentication such as HMAC (Hash-based Message Authentication Code). Specifically, the access control unit 12a performs tampering check of a message and HMAC authentication prior to remotely updating the public key and ID information. Here, the message is an update command for the public key and ID information (whose command arguments include new public key and ID information to be updated). Note that the authentication method is not limited to HMAC authentication. Further, the access control unit 12a does not restrict access of referring to the public key and the ID information, referring to the registration version information, and incrementing the registration version information.

The public key and ID information management unit 12b refers to and updates the public key and the ID information. Specifically, when the access control unit 12a determines to permit the update, the public key and ID information management unit 12b updates the public key and the ID information stored in the security module storage unit 12d.

The registration version management unit 12c refers to and updates (increments) the registration version information. The security module storage unit 12d stores public keys, pieces of ID information, and pieces of registration version information. The security module storage unit 12d also stores authentication passwords for updating the public keys and pieces of ID information. The security module control unit 12e controls each of the above units of the security module 12.

The device storage unit 13 stores configuration files. The right of access to the OS can be set in a configuration file. The device control unit 14 controls each of the above units to communicate with the management device 20. The device control unit 14 also records, in the device storage unit 13, the configuration files generated separately in the management device 20 for the respective applications.

In this way, since the information processing device 10 uses the security module 12 having the access control function and the data protection function which are independent of the OS, the information processing device 10 can check the integrity of the configuration file without depending on the authority setting for the OS.

The management device 20 includes a configuration file generation unit 21, a configuration file transmission unit 22, a public key and ID information registration unit 23, and a control unit 24.

The configuration file generation unit 21 has a function and a user interface for generating configuration files separately for the respective one or more AP programs 11 of one or more information processing devices 10. The configuration file generation unit 21 also includes functions of managing a private key for generating a digital signature and performing user authentication. For example, the configuration file generation unit 21 can also collectively add a single digital signature to a plurality of separate configuration files.

The configuration file transmission unit 22 transmits the configuration file (s) to one or more information processing devices 10. The public key and ID information registration unit 23 updates the public key and ID information of the security module 12 via the device control unit 14 of the information processing device 10. The public key and ID information registration unit 23 also has an HMAC generation function for HMAC authentication. The control unit 24 controls each of the above units to communicate with the information processing device 10.

Explanation of Data

Figure 2:
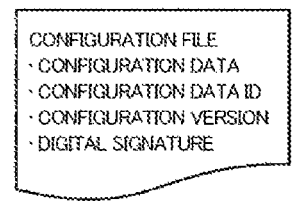
FIG. 2 illustrates an example of information included in a configuration file.

Here, the above-mentioned configuration file, public key and ID information, and registration version information will each be described. First, the configuration file will be described. As illustrated by way of example in FIG. 2, the configuration file is a file that includes configuration data, a configuration file ID, a configuration version, and a digital signature as constituent elements.

The configuration data is data (content) to be read by the AP program. The configuration data can be uniquely identified by the configuration file ID and the configuration version. The configuration file ID is a type of configuration file unique to the information processing device 10 and the AP program 11. Note that there may be a plurality of versions of configuration files having the same configuration file ID.

The configuration version is information for identifying the version of the configuration file having the same configuration file ID. The format of the version information matches the format of the registration version information. The digital signature is a digital signature, based on a public key cryptosystem (RSA algorithm or the like), for information including the configuration data, the configuration file ID, and the configuration version.

Figure 3:
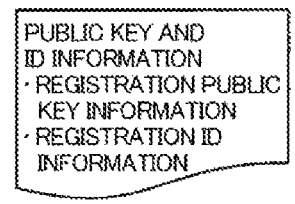
FIG. 3 illustrates an example of information included in public key and ID information.

Next, the public key and the ID information (the public key and ID information) will be described. As illustrated in FIG. 3, the public key and ID information is data necessary for verifying the digital signature of the configuration file, and is composed of registration public key information and registration ID information. This data does not need to be kept secret, but its integrity needs to be protected by the security module 12.

For example, the registration public key information is a verification key (public key) for the digital signature for the configuration file, and the registration ID information is the configuration data ID of the configuration file. In this case, the verification method may be any method as long as it directly verifies the digital signature by the public key information and collates the configuration data ID. Further, the registration public key information is not limited to this, and may be, for example, a root certificate for verifying the certificate of the verification key (public key) for the digital signature for the configuration file. Further, for example, the registration ID information may be the data ID of the configuration file and/or an identification ID of the certificate for the verification key (public key) for the digital signature for the configuration file.

In this case, for the verification method, the information processing device 10 stores the certificate of the verification key (public key) for the digital signature for the configuration file in the device storage unit 13 or the like. Then, the configuration file verification unit 11b first verifies the digital signature of the configuration file by the above certificate, then verifies the above certificate by the root certificate acquired from the security module, and further collates the configuration data ID.

Next, the registration version information will be described. The registration version information does not need to be kept secret, but its integrity needs to be protected by the security module. Further, as the registration version information, a calculation result of one-way operation is used. It will be described as being of the following two types specified in TPM 2.0 as typical examples, but is not limited to thereto.

For example, the registration version information includes a counter value (integer value) and a memory index of the counter value, and the increment method is new counter value=old counter value+1. Further, the registration version information may include a hash value (such as sha256) and a memory index of the hash value, and the increment method may be new hash value=hash (old hash value 1 hash (configuration file)). In this case, the initial value of the registration version information is registered as a new hash value for the old hash value being set to a random value. Note that since the random value is secret information and is not used thereafter, it is immediately deleted from the memory or the like.

[Processing Flow of Information Processing Device]

Figure 4:
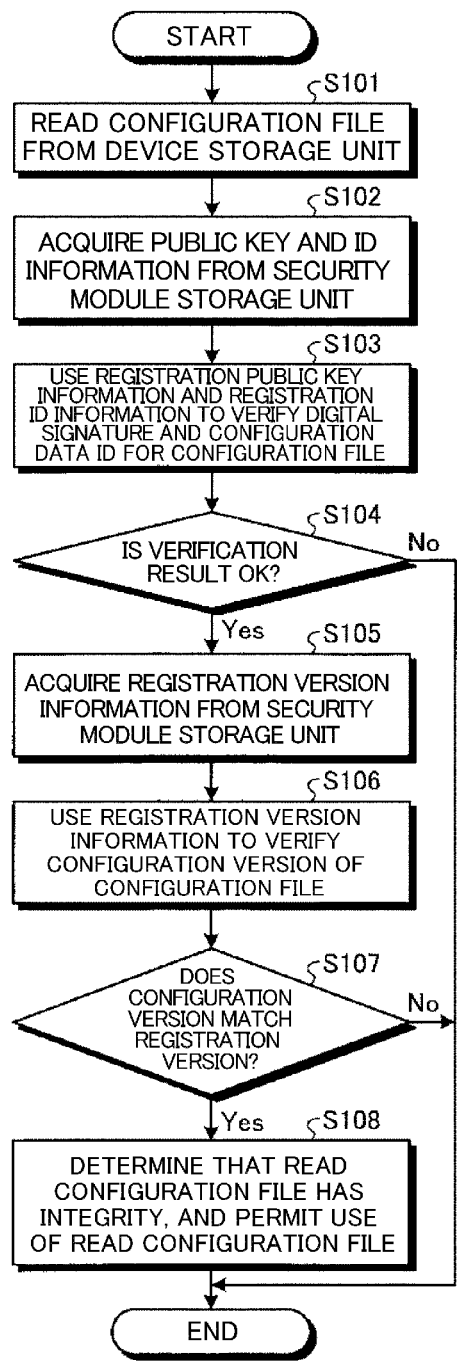
FIG. 4 is a flowchart for explaining configuration file use processing by an information processing device according to the first embodiment.
Figure 5:
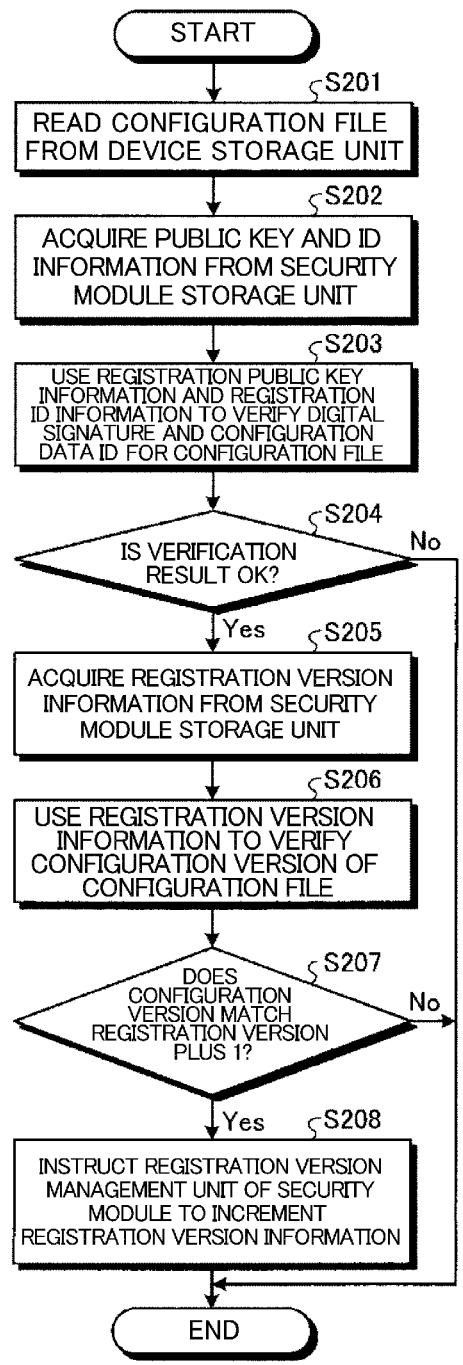
FIG. 5 is a flowchart for explaining configuration file update processing by the information processing device according to the first embodiment.
Figure 6:
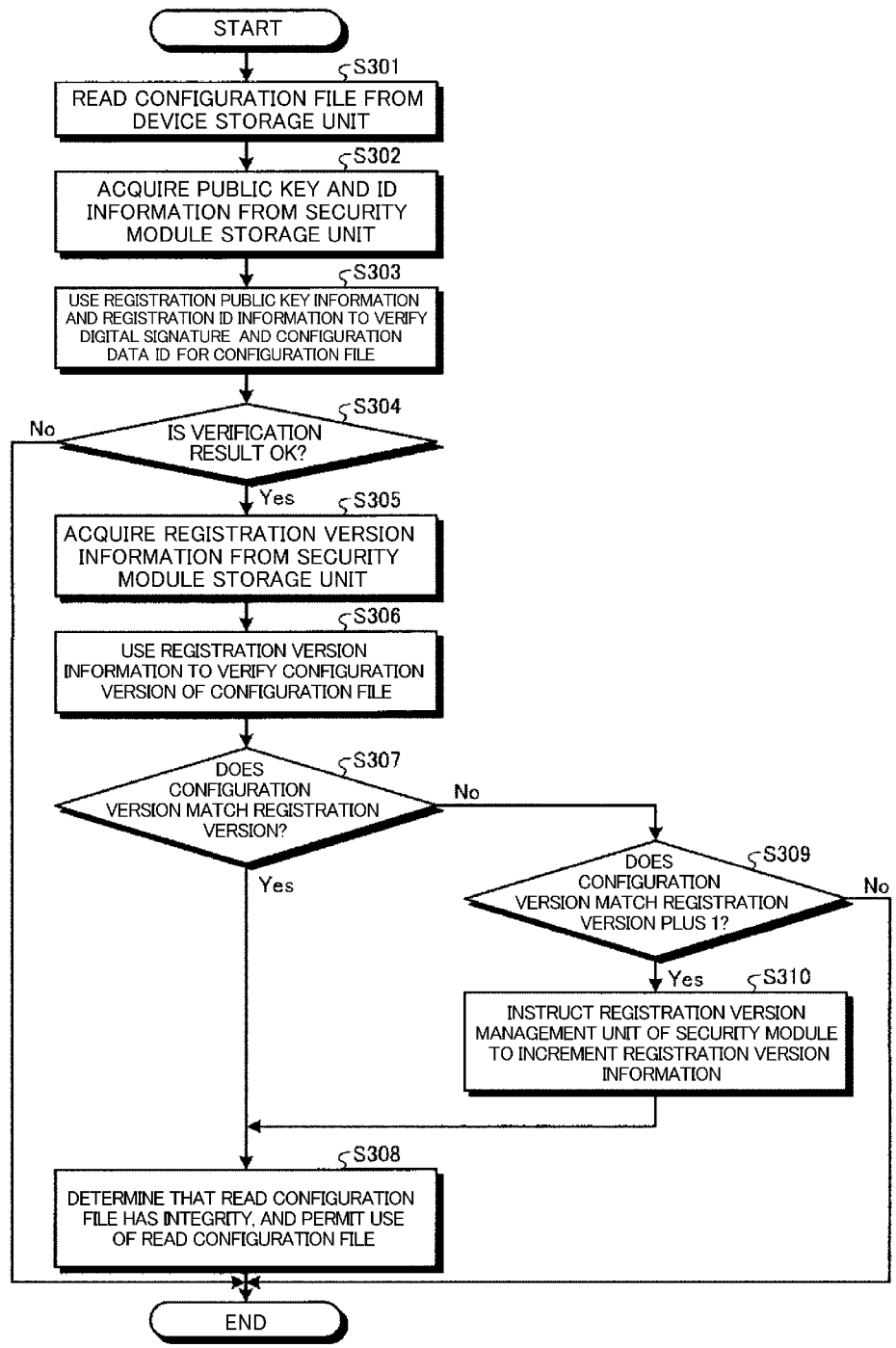
FIG. 6 is a flowchart for explaining AP program start processing by the information processing device according to the first embodiment.
Figure 7:
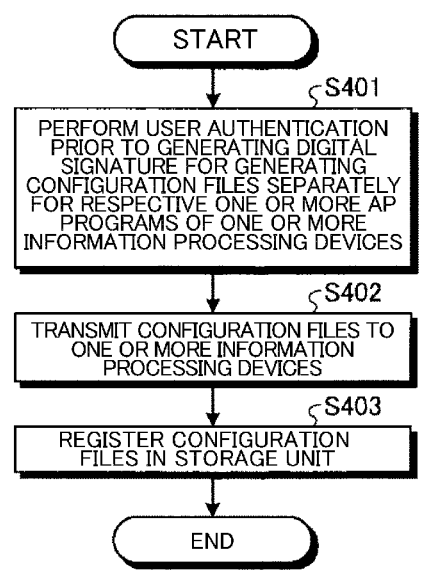
FIG. 7 is a flowchart for explaining configuration file record processing by the information processing device according to the first embodiment.
Figure 8:
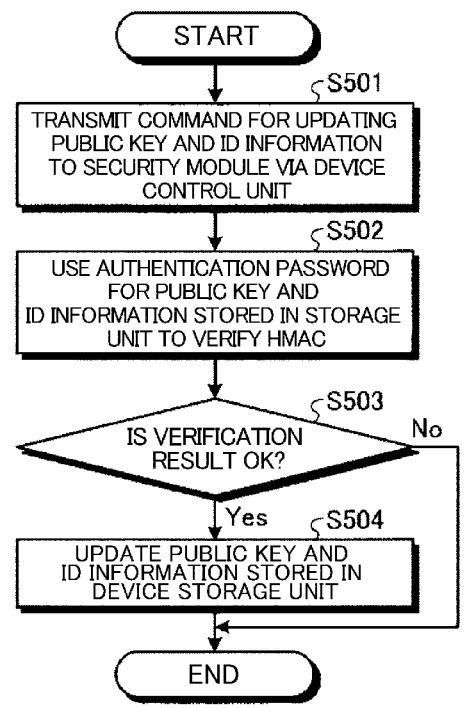
FIG. 8 is a flowchart for explaining public key and ID information update processing by the information processing device according to the first embodiment.

Next, a processing flow of the information processing device 10 according to the first embodiment will be described with reference to FIGS. 4 to 8. FIG. 4 is a flowchart for explaining configuration file use processing by the information processing device according to the first embodiment. FIG. 5 is a flowchart for explaining configuration file update processing by the information processing device according to the first embodiment. FIG. 6 is a flowchart for explaining AP program start processing by the information processing device according to the first embodiment. FIG. 7 is a flowchart for explaining configuration file record processing by the information processing device according to the first embodiment. FIG. 8 is a flowchart for explaining public key and ID information update processing by the information processing device according to the first embodiment.

First, the processing when the information processing device 10 uses a configuration file will be described with reference to FIG. 4. As illustrated in FIG. 4, first, the configuration file input unit 11a of the AP program 11 of the information processing device 10 reads a configuration file from the device storage unit 13 (step S101). Then, the configuration file verification unit 11b of the AP program 11 acquires public key and ID information from the security module storage unit 12d (step S102).

Subsequently, the configuration file verification unit 11b of the AP program 11 uses the registration public key information and the registration ID information to verify the digital signature and the configuration data ID of the configuration file (step S103). Then, as a result of the verification performed by the configuration file verification unit 11b, if the verification result is not OK (No at step S104), the processing ends. On the other hand, as a result of the verification performed by the configuration file verification unit 11b, if the verification result is OK (Yes at step S104), the configuration file version verification unit 11c of the AP program 11 acquires the registration version information from the security module storage unit 12d (step S105).

Subsequently, the configuration file version verification unit 11c of the AP program 11 uses the registration version information to verify the configuration version of the configuration file (step S106). Then, as a result of the verification performed by the configuration file version verification unit 11c of the AP program 11, if the configuration version and the registration version do not match (No at Step S107), the processing ends.

On the other hand, as a result of the verification performed by the configuration file version verification unit 11c of the AP program 11, if the configuration version and the registration version match (Yes at Step S107), the AP control unit 11e of the AP program 11 determines that the read configuration file has integrity, and permits the use of the read configuration file (step S108).

Next, the processing when the information processing device 10 updates a configuration file will be described with reference to FIG. 5. As illustrated in FIG. 5, first, the configuration file input unit 11a of the AP program 11 of the information processing device 10 reads a configuration file from the device storage unit 13 (step S201). Then, the configuration file verification unit 11b of the AP program 11 acquires public key and ID information from the security module storage unit 12d (step S202).

Subsequently, the configuration file verification unit 11b of the AP program 11 uses the registration public key information and the registration ID information to verify the digital signature and the configuration data ID of the configuration file (step S203). Then, as a result of the verification performed by the configuration file verification unit 11b, if the verification result is not OK (No at step S204), the processing ends. On the other hand, as a result of the verification performed by the configuration file verification unit 11b, if the verification result is OK (Yes at step S204), the configuration file version verification unit 11c of the AP program 11 acquires the registration version information from the security module storage unit 12d (step S205).

Subsequently, the configuration file version verification unit 11c of the AP program 11 uses the registration version information to verify the configuration version of the configuration file (step S206). Then, as a result of the verification performed by the configuration file version verification unit 11c of the AP program 11, if the configuration version and the registration version plus 1 do not match (No at Step S207), that is, the configuration version is not one new version next to the registration version, the processing ends.

On the other hand, as a result of the verification performed by the configuration file version verification unit 11c of the AP program 11, if the configuration version and the registration version plus 1 match (Yes at Step S207), the configuration file version update unit 11d of the AP program 11 instructs the registration version management unit of the security module to increment the registration version information (step S208).

Next, the processing when the information processing device 10 starts the AP program 11 will be described with reference to FIG. 6. In an example of FIG. 6, a case is described where the "configuration file use" processing and the "configuration file update" processing are performed as one processing procedure when the AP program 11 is started. As illustrated in FIG. 6, first, the configuration file input unit 11a of the AP program 11 of the information processing device 10 reads a configuration file from the device storage unit 13 (step S301). Then, the configuration file verification unit 11b of the AP program 11 acquires public key and ID information from the security module storage unit 12d (step S302).

Subsequently, the configuration file verification unit 11b of the AP program 11 uses the registration public key information and the registration ID information to verify the digital signature and the configuration data ID of the configuration file (step S303). Then, as a result of the verification performed by the configuration file verification unit 11b, if the verification result is not OK (No at step S304), the processing ends. On the other hand, as a result of the verification performed by the configuration file verification unit 11b, if the verification result is OK (Yes at step S304), the configuration file version verification unit 11c of the AP program 11 acquires the registration version information from the security module storage unit 12d (step S305).

Subsequently, the configuration file version verification unit 11c of the AP program 11 uses the registration version information to verify the configuration version of the configuration file (step S306). Then, as a result of the verification performed by the configuration file version verification unit 11c of the AP program 11, if the configuration version and the registration version match (Yes at Step S307), the AP control unit 11e of the AP program 11 determines that the read configuration file has integrity, and permits the use of the read configuration file (step S308).

Further, as a result of the verification performed by the configuration file version verification unit 11c of the AP program 11, if the configuration version and the registration version do not match (No at Step S307) and the configuration version and the registration version plus 1 match (Yes at Step S309), the configuration file version update unit 11d of the AP program 11 instructs the registration version management unit of the security module to increment the registration version information (step S310).

On the other hand, as a result of the verification performed by the configuration file version verification unit 11c of the AP program 11, if the configuration version and the registration version do not match (No at Step S307), and as a result of the verification performed by the configuration file version verification unit 11c of the AP program 11, if the configuration version and the registration version plus 1 do not match (No at Step S309), the processing ends.

Next, the processing of generating and recording a configuration file by the information processing device 10 and the management device 20 will be described with reference to FIG. 7. As illustrated in FIG. 7, first, the configuration file generation unit 21 of the management device 20 generates configuration files separately for the respective one or more AP programs 11 of one or more information processing devices 10 (step S401). Note that at this time, the configuration file generation unit 21 performs user authentication prior to generating a digital signature.

Subsequently, the configuration file transmission unit 22 transmits the configuration files to the one or more information processing devices 10 (step S402). Then, the device control unit 14 records the configuration files in the device storage unit 13 (step S403).

Next, the processing when the information processing device 10 and the management apparatus 20 update the public key and ID information will be described with reference to FIG. 8. As illustrated in FIG. 8, first, the public key and ID information registration unit 23 transmits a command for updating the public key and ID information to the security module 12 via the device control unit 14 (step S501). It is assumed that this command includes an HMAC for authentication, and that the user has input the authentication password to create the HMAC.

Then, the access control unit 12a of the security module 12 uses the authentication password of the public key and ID information stored in the security module storage unit 12d to verify the HMAC (step S502). As a result of the verification performed by the access control unit 12a of the security module 12, If the verification result is not OK (No at step S503), the processing ends.

As a result of the verification by the access control unit 12a of the security module 12, if the verification result is OK (Yes at Step S503), the public key and ID information management unit 12b of the security module updates the public key and ID information stored in the security module storage unit 12d (step S504).

As described above, for example, a user adds a digital signature to the configuration file to which the version information is added, and the AP program 11 verifies the signature by the public key and ID information stored in the security module 12. Then, the AP program 11 checks the integrity of the version information and the configuration file based on the above verification result. Furthermore, the information processing device 10 authenticates the user by the authentication password stored in the security module 12 to update and register the public key and ID information.

[Operating Cycles]

Figure 9:
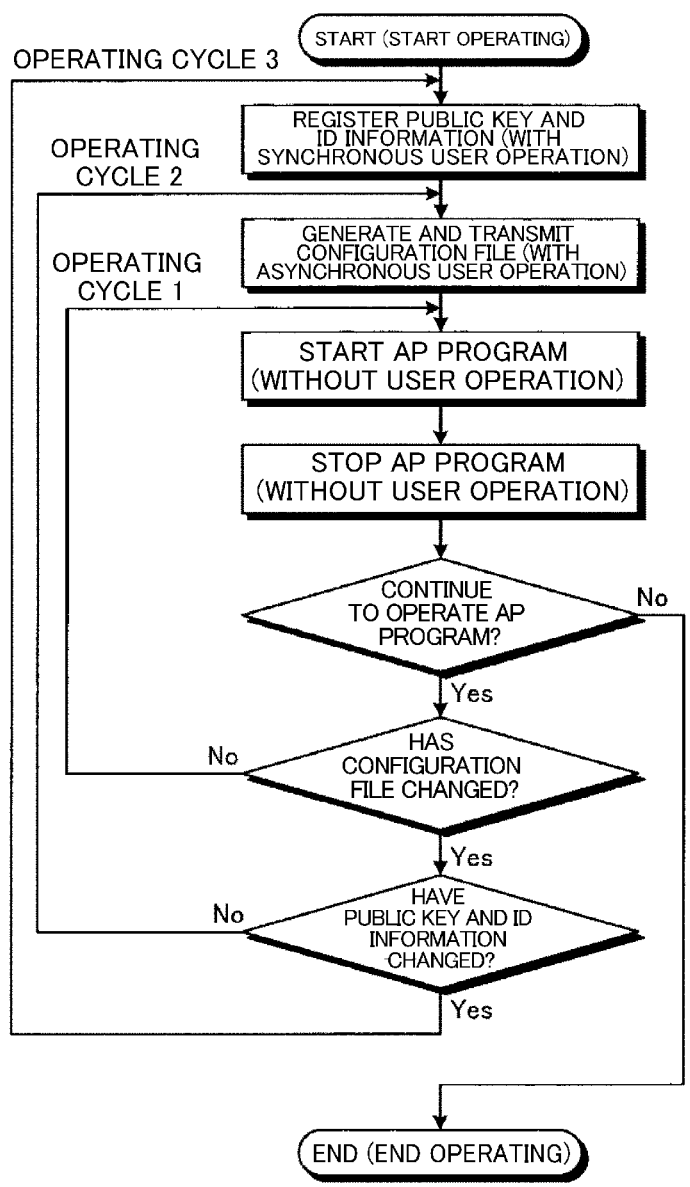
FIG. 9 is a diagram for explaining operating cycles in the information processing device according to the first embodiment.

Operating cycles in the information processing device 10 according to the first embodiment will now be described with reference to FIG. 9. FIG. 9 is a diagram for explaining operating cycles in the information processing device according to the first embodiment. As illustrated in FIG. 9, the operation in the information processing device 10 is composed of three Operating cycles 1 to 3 which have an inclusive relationship. Operating cycle 1 is a cycle of starting and stopping the AP program 11, and has the highest frequency. At startup, the AP program 11 automatically checks the integrity and version of the configuration file. Further, it can be automatically executed without user operation (authentication operation or the like).

Operating cycle 2 is a cycle of changing the configuration file of the AP program. 11, and is less frequent than Operating cycle 1. Generation of the configuration file involves user authentication operation to add a digital signature. It can be performed on one or more AP programs 11 of one or more information processing devices 10 by one asynchronous operation. The asynchronous means that the timing for the user generating the configuration file and the timing for the AP program 11 updating the configuration file (incrementing the registration version information of the security chip) are asynchronous.

Further, Operating cycle 3 is changing the public key and ID information, and is less frequent than Operating cycle 2 (e.g., a cycle of several years). Here, it involves a user authentication operation for updating the security module and ID information. Synchronous processing is desirable for safe implementation.

As described above, operating with high frequency can be performed with few user operations, and operating with many user operations can be performed with low frequency. Therefore, it is possible to sufficiently reduce the total operation cost and provide efficient operating even for a large number of devices and a large number of AP programs.

Further, with the above-described configuration, in operating cycles, operating with high frequency can be performed with few user operations, and operating with many user operations can be performed with low frequency. As described above, the update of the version information is not limited to for programs to be executed before the OS is started, and the integrity check of the configuration file and the like can be performed at low cost only with the general AP program 11.

Effects of First Embodiment

As described above, the information processing device 10 according to the first embodiment acquires, from the security module storage unit 12d with tamper resistance, a public key and ID information of the configuration file for verifying a digital signature of a configuration file. Then, the information processing device 10 uses the acquired public key and ID information to cause the application program 11 to execute the processing of verifying the integrity of the configuration data of the configuration file. Then, the information processing device 10 acquires registration version information from the security module storage unit 12d, and uses the acquired registration version information to cause the application program 11 to execute the processing of verifying the configuration version of the configuration file. Further, the information processing device 10 updates the registration version information to the version of the configuration version when the configuration version of the configuration file and the registration version information satisfy a predetermined condition.

Further, in the information processing device 10 according to the first embodiment, the determination of the integrity and version of the configuration file is based on the access control and tamper resistance of the security module 12 independent of the OS function, not depending only on the access control of the OS. Accordingly, it is possible for an application program to properly check the integrity of configuration data without depending on the OS.

Further, for example, if a malicious operation or an operational failure made by a user causes a route (security hole) that allows malware to intrude with administrator authority in a system and then the malware goes into it, the malware will tamper with any configuration file with administrator authority. Even in such a case, the AP program 11 of the information processing device 10 can detect tampering of the configuration file. This is because it is much more difficult for malware to tamper with data in the security module storage unit 12d and/or function (s) of the security module 12 than to tamper with file(s) on and/or function(s) of the OS.

Further, the verification method of the present application is available in any AP program 11 to be executed on the OS of the information processing device 10 that includes the security module 12. Further, the information processing device 10 can confirm, for example, the version upgrade to the only configuration file version specified by the user. This is because the configuration data is uniquely identified by the "configuration file ID" and the "configuration version", which are described in the configuration file, and the "configuration file ID" is a type of configuration file unique to the information processing device 10 and the AP program 11.

[System Configuration, Etc.]

Further, each component of each device illustrated is a functional concept and does not necessarily need to be physically configured as illustrated. In other words, a specific form of distribution and integration of the devices is not limited to the illustrated one, and all or a part thereof may be functionally or physically distributed or integrated on any unit basis in accordance with various loads and usage conditions. Further, all or any part of each processing function performed by each device can be implemented by a CPU and a program analyzed and executed by the CPU, or can be implemented as hardware by wired logic.

Further, among the processing described in the embodiment, all or a part of the processing described as being performed automatically can be manually performed, or all or a part of the processing described as being performed manually can be performed automatically by a known method. In addition, the processing procedures, control procedures, specific names, and information including various data and parameters described in the above documents and drawings can be arbitrarily changed unless otherwise specified.

[Program]

Figure 10:
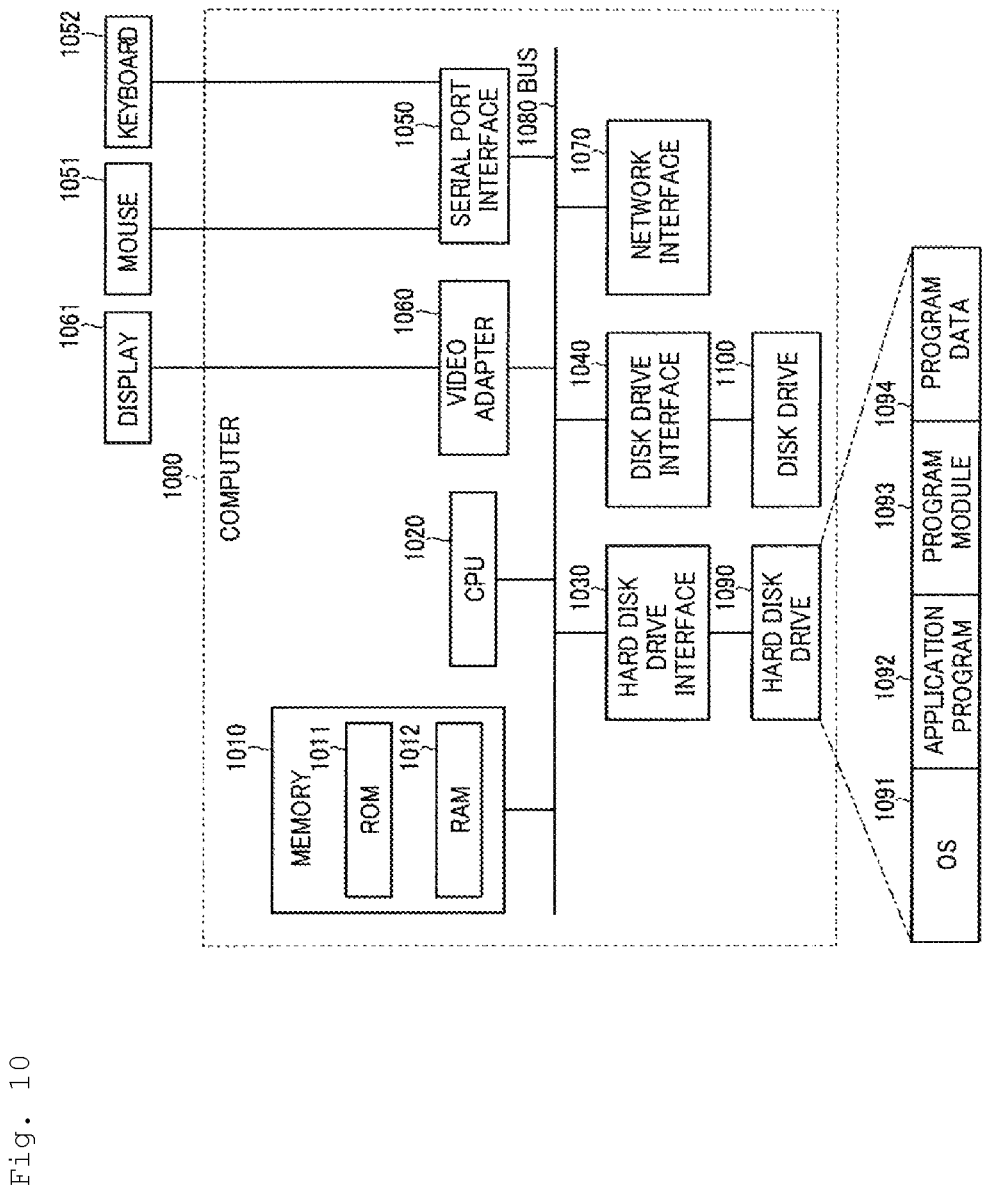
FIG. 10 is a diagram illustrating a computer that executes a verification program.

FIG. 10 is a diagram illustrating a computer that executes a verification program. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These components are connected by a bus 1080.

The memory 1010 includes a ROM (Read Only Memory) 1011 and a RAM 1012. The ROM 1011 stores, for example, a boot program such as a BIOS (Basic Input Output System). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to, for example, a mouse 1051 and a keyboard 1052. The video adapter 1060 is connected to, for example, a display 1061.

The hard disk drive 1090 stores, for example, an OS 1091, an application program 1092, a program module 1093, and program data 1094. Accordingly, a program that defines each processing in the information processing device 10 is implemented as the program module 1093 in which codes executable by the computer are described. The program module 1093 is stored in, for example, the hard disk drive 1090. For example, the program module 1093 for executing processing corresponding to the functional configuration of the device is stored in the hard disk drive 1090. Note that the hard disk drive 1090 may be replaced with an SSD (Solid State Drive).

Further, data used in the processing in the above-described embodiment is stored as the program data 1094 in, for example, the memory 1010 or the hard disk drive 1090. Then, the CPU 1020 loads the program module 1093 and the program data 1094 stored in the memory 1010 or the hard disk drive 1090 into the RAM 1012 as necessary, and executes them in the above-described procedures.

Note that the program module 1093 and the program data 1094 are not limited to being stored in the hard disk drive 1090, but may be stored in, for example, a removable storage medium and read out by the CPU 1020 via the disk drive 1100 or the like. Alternatively, the program module 1093 and the program data 1094 may be stored in another computer connected via a network or WAN. Then, the program module 1093 and the program data 1094 may be read from the other computer by the CPU 1020 via the network interface 1070.

REFERENCE SIGNS LIST

10 Information processing device
11 AP program
11a Configuration file input unit
11b Configuration file verification unit
11c Configuration file version verification unit
11d Configuration file version update unit
11e AP control unit
12 Security module
12a Access control unit
12b Public key and ID information management unit
12c Registration version management unit
12d Security module storage unit
12e Security module control unit
13 Device storage unit
14 Device control unit
20 Management device
21 Configuration file generation unit
22 Configuration file transmission unit
23 Public key and ID information registration unit
24 Control unit

The invention claimed is:

1. An information processing device comprising:
a memory; and
processing circuitry coupled to the memory and configured to:
acquire, from a storage of a security module with tamper resistance, information of a verification key and ID information of a configuration file for verifying a digital signature of the configuration file, wherein the verification key is a public key;
use the acquired information of the verification key and the ID information to cause an application program to execute processing of verifying integrity of configuration data of the configuration file by verifying the digital signature of the configuration file using the information of the verification key;
acquire registration version information from the storage of the security module, and use the acquired registration version information to cause the application program to execute processing of verifying a configuration version of the configuration file; and
update the registration version information stored in the storage of the security module with tamper resistance to the configuration version of the configuration version when the configuration version of the configuration file and the registration version information satisfy a predetermined condition.

2. The information processing device according to claim 1, the processing circuitry is further configured to record configuration files generated separately for respective applications in a storage.

3. The information processing device according to claim 1, the processing circuitry is further configured to:
receive an update request for the information related to the verification key and the ID information which are stored in the storage of the security module, verify an authentication password input by a user, and determine whether to permit update of the pieces of information according to a result of verification, and
update the information related to the verification key and the ID information which are stored in the storage of the security module when determining to permit the update.

4. The information processing device according to claim 1, wherein the predetermined condition can be set and changed.

5. A verification method, comprising:
acquiring, from a storage of a security module with tamper resistance, information of a verification key and ID information of a configuration file for verifying a digital signature of the configuration file, wherein the verification key is a public key;
using the acquired information of the verification key and the ID information to cause an application program to execute processing of verifying integrity of configuration data of the configuration file by verifying the digital signature of the configuration file using the information of the verification key;
acquiring registration version information from the storage of the security module, and using the acquired registration version information to cause the application program to execute processing of verifying a configuration version of the configuration file; and
updating the registration version information stored in the storage of the security module with tamper resistance to the configuration version of the configuration version when the configuration version of the configuration file and the registration version information satisfy a predetermined condition, by processing circuitry.

6. A non-transitory computer-readable recording medium storing therein a verification program that causes a computer to execute a process comprising:
- acquiring, from a storage of a security module with tamper resistance, information of a verification key and ID information of a configuration file for verifying a digital signature of the configuration file, wherein the verification key is a public key;
- using the acquired information of the verification key and the ID information to cause an application program to execute processing of verifying integrity of configuration data of the configuration file by verifying the digital signature of the configuration file using the information of the verification key;
- acquiring registration version information from the storage of the security module, and using the acquired registration version information to cause the application program to execute processing of verifying a configuration version of the configuration file; and
- updating the registration version information stored in the storage of the security module with tamper resistance to the configuration version of the configuration version when the configuration version of the configuration file and the registration version information satisfy a predetermined condition.

7. The information processing device according to claim 1, the processing circuitry coupled to the memory further configured to:
- update the verification key according to the version of the configuration version.

\* \* \* \* \*